(12) United States Patent
Horwarth et al.

(10) Patent No.: US 6,810,600 B1
(45) Date of Patent: Nov. 2, 2004

(54) APPARATUS AND METHOD FOR MONITORING ALIGNMENT OF A CNC MACHINE SPINDLE TRUNNION AXIS A

(75) Inventors: William A. Horwarth, Mason, OH (US); Walter S. Howard, Cincinnati, OH (US)

(73) Assignee: Unova IP Corp., Everett, WA (US)

( * ) Notice: Subject to any disclaimer, the term of this patent is extended or adjusted under 35 U.S.C. 154(b) by 0 days.

(21) Appl. No.: 09/496,249

(22) Filed: Feb. 2, 2000

(51) Int. Cl.[7] .................................. G01D 21/00
(52) U.S. Cl. .......................... 33/645; 33/503; 33/533; 33/543; 33/567
(58) Field of Search ................... 33/645, 502, 503, 33/533, 613, 556, 558, 559, 561, 543, 548, 567; 73/1.79

(56) References Cited

U.S. PATENT DOCUMENTS

| | | | | | |
|---|---|---|---|---|---|
| 2,367,513 A | * | 1/1945 | Malhiot | ...................... | 33/613 |
| 3,089,248 A | * | 5/1963 | Haggar | ........................ | 33/567 |
| 3,599,339 A | * | 8/1971 | Adamczyk | ................... | 33/556 |
| 3,600,813 A | * | 8/1971 | Davis | .......................... | 33/562 |
| 3,750,295 A | * | 8/1973 | Nordmann et al. | ........... | 33/548 |
| 3,940,854 A | * | 3/1976 | Maxey | ........................ | 33/503 |
| 3,990,585 A | * | 11/1976 | Johansson | .................... | 483/42 |
| 4,168,576 A | * | 9/1979 | McMurtry | ................... | 33/503 |
| 4,216,626 A | * | 8/1980 | Starp | ......................... | 451/163 |
| 4,261,107 A | * | 4/1981 | Coleman et al. | .............. | 33/503 |
| 4,523,450 A | * | 6/1985 | Herzog | ........................ | 33/503 |
| 4,612,697 A | * | 9/1986 | Palfery et al. | ................ | 483/14 |
| 4,662,074 A | | 5/1987 | Knapp et al. | | |
| 4,796,195 A | | 1/1989 | Haggerty | | |
| 4,809,200 A | | 2/1989 | Moore et al. | | |
| 4,957,013 A | * | 9/1990 | Broghammer et al. | ..... | 74/89.36 |
| 4,985,857 A | | 1/1991 | Bajpai et al. | | |
| 5,218,548 A | | 6/1993 | Sumita et al. | | |
| 5,220,510 A | | 6/1993 | Araki | | |
| 5,309,648 A | * | 5/1994 | Allard et al. | ................. | 33/567 |
| 5,329,457 A | | 7/1994 | Hemmerle et al. | | |
| 5,345,390 A | | 9/1994 | Greenip, Jr. et al. | | |
| 5,357,450 A | | 10/1994 | Hemmerle et al. | | |
| 5,848,477 A | * | 12/1998 | Wiedmann et al. | ........... | 33/503 |
| 2002/0000047 A1 | * | 1/2002 | Yoda et al. | ................... | 33/503 |

* cited by examiner

Primary Examiner—Diego Gutierrez
Assistant Examiner—Travis Reis
(74) Attorney, Agent, or Firm—Reising, Ethington, Barnes, Kisselle, P.C.

(57) ABSTRACT

The present invention provides a fixture, system, and method for automatically and quickly indicating a condition of a the trunnion axis A of a computer numerically controlled (CNC) machine and optionally an alert to a machine operator. The fixture has a body preferably constructed of parallel first and second walls and a third wall disposed between, at right angles to, and connected to the first and second walls all mounted on a base. First, second, and third probe blocks are mounted on the body at first, second, and third angular positions, respectively, along an arc circumscribed by a radius about an axis of rotation. The first, second, and third blocks are mounted on an outer surface of one of the first and second parallel walls, the outer surface facing away from an other of the first and second parallel walls. The blocks include preferably co-planer respective first, second, and third flat surfaces with respective normals parallel to the axis of rotation. The first and second walls have first and second recesses respectively in their unattached ends. The recesses are preferably arcuate with edges circumscribed about the axis of rotation. A spindle mounted probe is mounted in a tool holder of a spindle of the machine and a CNC controller is used for moving and operating the spindle mounted probe. Means are provided for and measuring, recording, and displaying location data probed by the probe against the flat surfaces. The means is effective to display the location data as a deviation from baseline measurements.

16 Claims, 9 Drawing Sheets

APPARATUS AND METHOD FOR MONITORING ALIGNMENT OF A CNC MACHINE SPINDLE TRUNNION AXIS A

BACKGROUND OF THE INVENTION

1. Field of the Invention

This invention relates generally to numerically controlled machine tools having a spindle rotatable about a spindle trunnion axis A. In particular, this invention relates to an apparatus and method for maintaining accuracy of machining operations conducted with a numerically controlled machine tool by taking measurements with the spindle at different angles about the spindle trunnion A axis.

2. Disussion of the Background Art

Once a machine tool has been aligned to desired specifications, it is desirable to monitor that alignment by some means, for changes which would decrease the machine's accuracy. Once alignment has changed beyond a predetermined amount or tolerance, the machine will be less accurate. Early detection of a change and correction thereof can lessen the event of, and in many cases, entirely prevent, the production of scrap parts.

In the event of a wreck or other mishaps occurring in a machine tool, where it is fairly evident that a change in accuracy is likely to have occurred, it is also very desirable to have an apparatus and method which could quickly determine what alignments change on the machine. With regard to ordinary day-to-day machining operations, accuracy of a machine may not be readily apparent in parts produced, since the parts may still be within tolerance. However, at a subsequent time, a scrap part produced will indicate that realignment of the machine is needed, and this "post-process" fault correction can, in some cases, be a very expensive way to determine the need for machine corrections. In the case of extremely expensive parts, such as aircraft parts, which are often made of exotic alloys and have a very high number of hours involved in machining away stock to produce the finished part, the expense of finding out after a part has been produced that the machine needs alignment, may be very expensive.

It is well-known in the machine tool arts to use a touch trigger probe, which is periodically swapped with the tool in the spindle, to probe and detect where particular surfaces are on a part, for example. One example of the probing of a part to provide information necessary to offset the program within a machine control, to suit the current location of a part, is taught in U.S. Pat. No. 4,796,195, of W. A. Haggerty, issued Jan. 3, 1989. Another example of a machine, which probes a plurality of jig members distributed on a work table of a machine tool, is taught in U.S. Pat. No. 5,220,510, of H. Araki, issued Jun. 15, 1993. In this patent, a reference coordinate system of a machine control is three dimensionally corrected based on jig members which define space lattice points.

With regard to machine alignments, several patents have taught a method for sensing machine alignment through probing a known standard or fixture, then computing where a error in positioning occurs, and printing out specific instructions on the machine control to direct a machine maintenance person as to adjustment to perform. Such an apparatus is shown in U.S. Pat. No. 5,357,450, of R. D. Hemmerle et al., issued Feb. 10, 1994, entitled "Automated Maintenance System for Computer Numerically Controlled Machine".

Other patents have taught supplying graphical representations for the aid of an operator, such graphical representations being the result of an operational problem sent by particular sensors. An example of controliwith graphical representation of where problems have arisen, is shown in U.S. Pat. No. 5,345,390 of L. E. Grenip, Jr. et al., issued Sep. 6, 1994. Another patent teaching a method and apparatus for diagnosing machines, is shown in U.S. Pat. No. 4,985,857, of A. Bajpai, et al., issued Jan. 15, 1991, and U.S. Pat. No. 4,809,200, of B. V. Moore et al., issued Feb. 28, 1989.

Cincinnati Machine's artiFACT™ system is a CNC performance monitor system that quickly detects a change in the machine toolls accuracy. The artiFACT™ system include's an artiFACT™ fixture, NC program, and analysis software for use with a personal computer. The fixture is mounted on a dedicated machine pallet and probe blocks on the fixture are probed with a spindle-mounted trigger type probe, and then the measured data is compared to baseline data in the machine control. Differences outside specified tolerances indicate that certain machine alignments have changed, generating an alert message on the machine control screen. An alert indicates that machine alignments need to be corrected. The personal computer analysis software displays analyses indicating which areas need correcting. The software also plots periodic measured data versus the baseline for a given fixture point for convenient trend analysis.

The Cincinnati Machine artiFACT™ system probes the fixture with the machine spindle probe touching against fixture probe blocks in X, Y, and Z directions. The Cincinnati Machine artiFACT™ system invention overcomes difficulties and, in some cases shortcomings, of the prior art, by providing an easily probed fixture having target blocks for probing in at least three coordinate directions, an NC probe routine program, an NC comparator program, and an analysis program, wherein the analysis program is conveniently run on a personal computer using data gathered from the probe routine and comparator programs. This system provides data indicating squareness of the machine. The Cincinnati Machine artiFACT™ system for 4 axis condition monitoring is described in greater detail in the Operating Parts/Service Manual for Cincinnati Milacron artiFACT™ (ATS) Automatic Test System for Horizontal Machining Centers, Publication No. 123-SP-98092, published originally by Cincinnati Milacron and incorporated herein by reference. It is highly desirable to have a system that indicates condition of the trunnion axis or A axis of the machine about which the spindle rotates.

SUMMARY OF THE INVENTION

The present invention provides a fixture, system, and method for automatically and quickly indicating a condition of a trunnion axis A of a computer numerically controlled (CNC) machine and optionally an alert to a machine operator.

The machine tool monitoring fixture has a body preferably constructed of parallel first and second walls and a third wall disposed between, at right angles to, and connected to the first and second walls, the walls all being mounted on a base. First, second, and third probe blocks are mounted on the body at first, second, and third angular positions respectively along an arc circumscribed by a radius about an axis of rotation. The first, second, and third blocks are mounted on an outer surface of one of the first and second parallel walls, the outer surface facing away from an other of the first and second parallel walls. The first, second, and third probe blocks include first, second, and third flat surfaces with respective normals parallel to the axis of rotation and preferably co-planer. The first and second walls have first and second recesses, respectively, in their unattached end and are preferably arcuate with arcuate edges circumscribed about the axis of rotation.

The monitoring system of the present invention is used for monitoring alignment of a spindle trunnion axis of a computer numerically controlled (CNC) machine and includes the fixture and a probe to measure locations of features including the probe blocks on the fixture. The probe is mounted in a tool holder mounted of a spindle of the machine and a CNC controller is used for moving and operating the spindle mounted probe. Means are provided for and measuring, recording, and displaying location data probed by the probe against the flat surfaces. The means is effective to display the location data as a deviation from baseline measurements.

The present invention provides monitoring fixture and a system and method for a quickly and automatically indicating a condition of the trunnion axis or A axis of the machine about which the spindle rotates.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
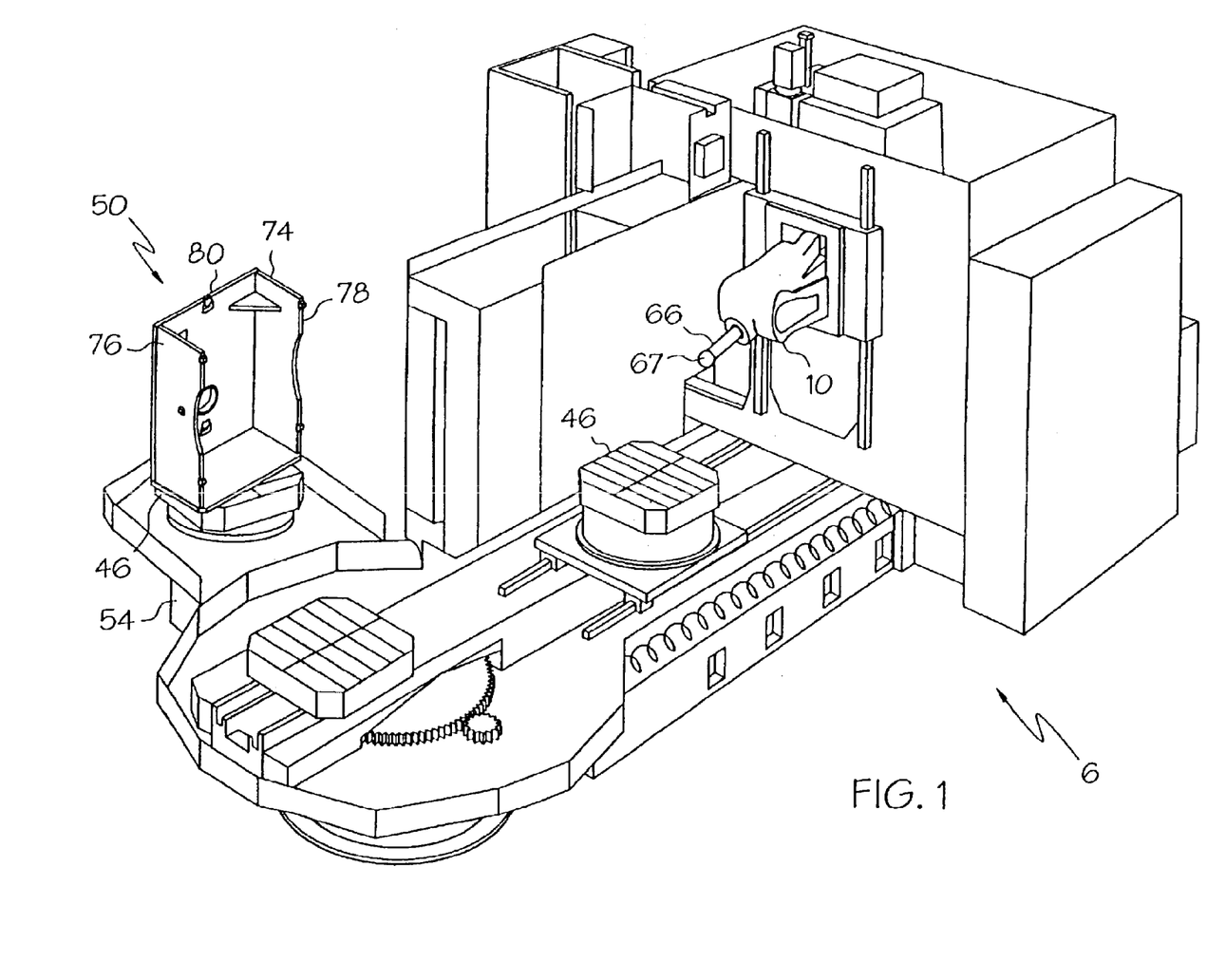
FIG. 1 is a perspective view illustration of a CNC machine and condition monitoring fixture illustrating an exemplary embodiment of the present invention.
Figure 2:
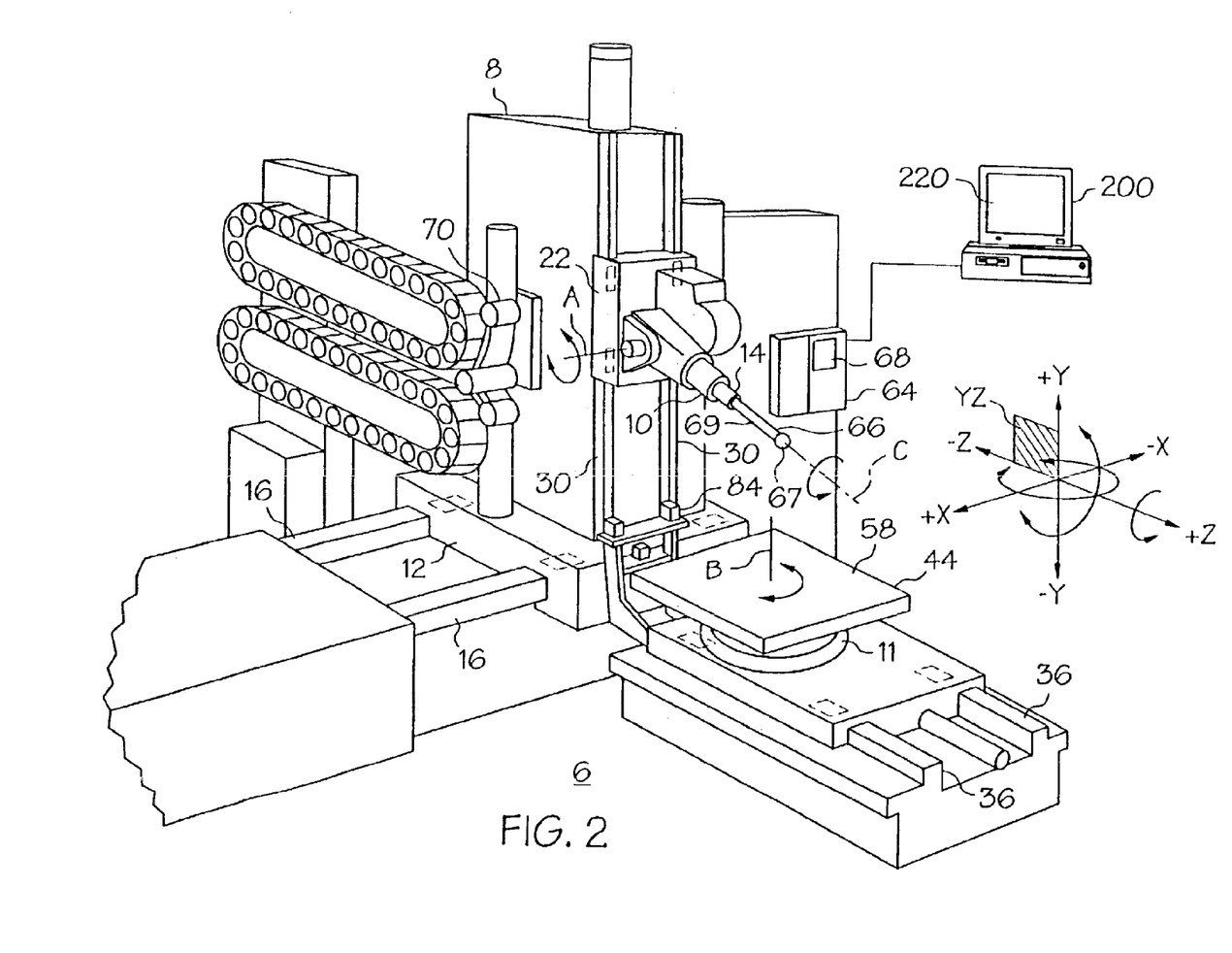
FIG. 2 is a more detailed perspective view illustration of the CNC machine in FIG. 1 and a computer for use in an exemplary embodiment of the present invention.
Figure 3:
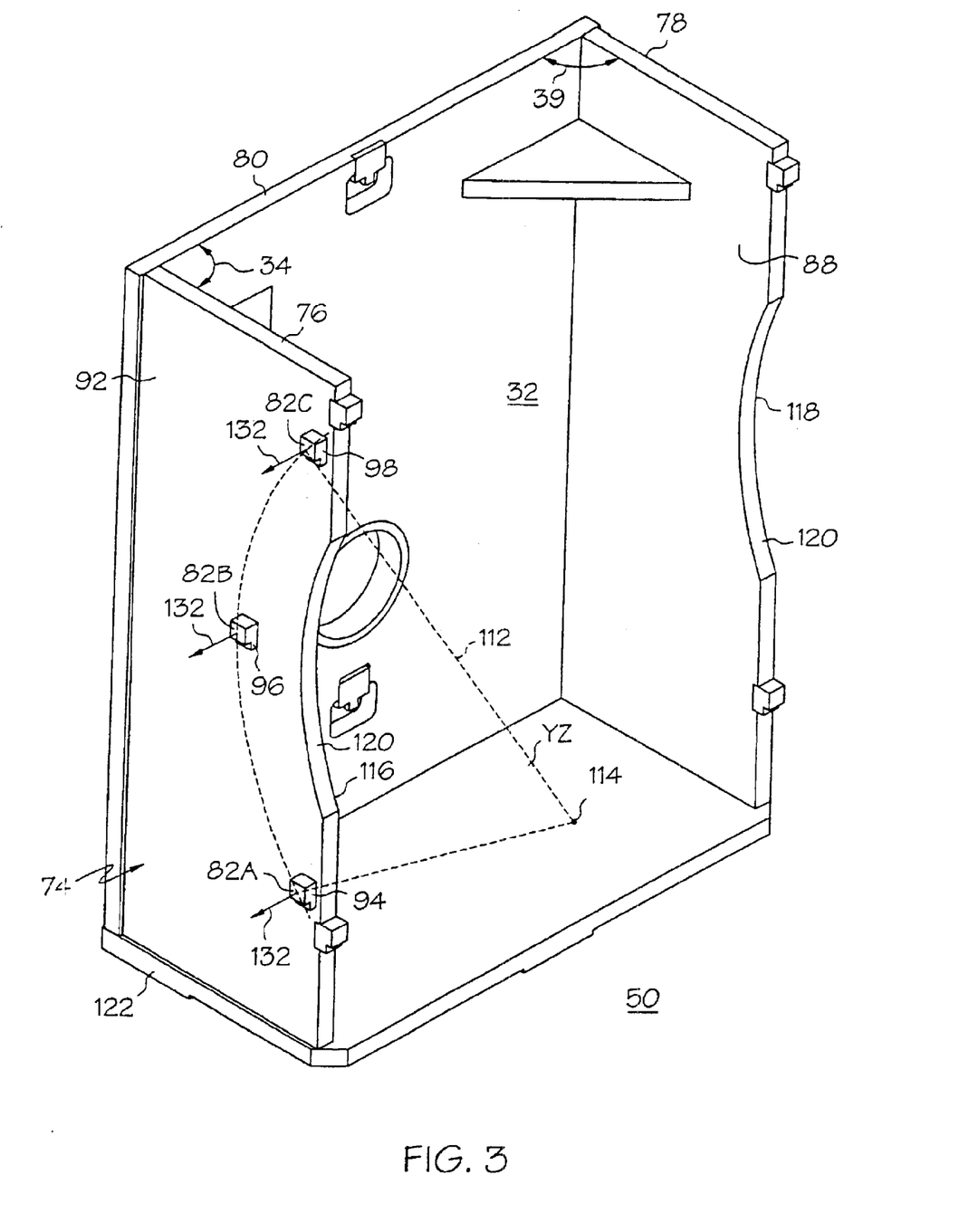
FIG. 3 is an enlarged and more detailed perspective view illustration of the condition monitoring fixture illustrating an exemplary embodiment of the present invention.

Illustrated in FIGS. 1 and 2 is a computer numerically controlled (CNC) machine 6 of the 5 axis multi-purpose milling, drilling, and boring machine type such as the T-30 manufactured by Cincinnati Machine formerly Cincinnati Milacron. CNC machine 6 is generally constructed about a column 8 mounted on a linearly movable machine base 12 slidably resting on horizontal X direction guideways 16 parallel to the X axis. CNC machine 6 functions to position, power, and control a spindle mechanism 10, rotatable about its centerline of rotation C, relative to a positionable rotary work table 11. Powered by the machine's motor (not shown), spindle mechanism 10 includes a tool holder 14 adapted for receiving and retaining various cutting tools, measuring devices, and probes used in the machining process.

CNC machine 6 provides a means to move spindle mechanism 10, while it is spinning a tool mounted in its tool holder 14, relative to a work piece (not shown) mounted at a particular position on a work table 11. Relative positioning between work piece and spinning spindle mechanism 10 is provided along 3 linear motion axis X, Y, and Z and about two rotational axes, a trunnion axis A and a rotary table axis B as shown in the corresponding reference axis in FIG. 1. CNC machine 6 has a spindle carrier 22 to which spindle mechanism 10 is trunnioned thereby allowing spindle mechanism 10 to be pivoted about the trunnion axis A which is parallel to the X axis. The centerline of rotation C, of spindle mechanism 10, is parallel to the Z axis when trunnion angle A=0 degrees. Spindle carrier 22 is slidably mounted to vertical or Y guideways 30, which in turn are mounted to column 8, to provide motion along the Y axis for spindle mechanism 10.

Horizontal Z direction guideways 36 slidably support work table 11 having a tabletop 44 rotatable about the vertical rotary table axis B which, when properly aligned, is parallel to the Y axis. A machine condition monitoring fixture 50, in a preferred embodiment of the present invention, is designed to be used mounted on a movable pallet 46 which is removably mountable to tabletop 44. The monitoring fixture 50 has features for monitoring the condition of the trunnion axis A as will be described further on. The monitoring procedure of the present invention can move the monitoring fixture 50 from a stored position to a position mounted on the tabletop 44 on an automated guide vehicle 54. The tabletop 44 provides a reference top surface 58 which is rotatable about table axis B.

An automatic tool changing mechanism 70 is provided for CNC machine 6, of a type commonly used in the industry, and is adapted to store tools or cutters as well as testing devices such as trigger probe 66 with a probe tip 67 at the end of a probe stylus 69 used in the present invention and illustrated in FIG. 2. A conventional trigger type probe 66 such as a Renishaw touch trigger probe, which can also stored in automatic tool changing mechanism 70 is mounted in spindle mechanism 10. Control of CNC machine is provided by a computerized controller 64 having a display 68 and generally mounted near or in the vicinity of column 8 and work table 11. Computerized controller 64 is capable of being programmed to machine a work piece and operate the probe 66.

Illustrated in FIGS. 1, 3–5, and 8–12, is an exemplary embodiment of the monitoring fixture 50 having a body 74 with parallel first and second walls 76 and 78, respectively. A third wall 80 disposed between and connected at right angles 34 to the first and second walls 76 and 78, respectively. The first, second and third walls 76, 78, and 80 have interior surfaces 88 facing inwardly of the body 74 towards a hollow interior 32 of the body and exterior surfaces 92 facing outwardly of the body. First, second, and third, probe blocks 94, 96, and 98, respectively, are mounted on one of the outside surfaces of the first wall 76 at first, second, and third angular positions 102, 104, and 106, respectively, along an arc 110 circumscribed by a radius 112 about an axis of rotation 114.

Figure 4:
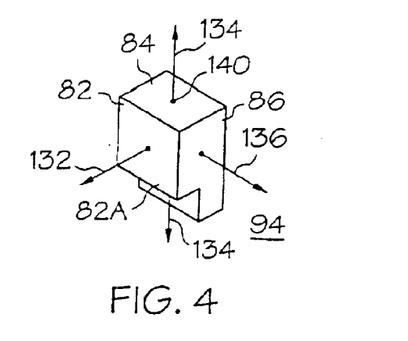
FIG. 4 is an enlarged perspective view illustration of a probing block on the condition monitoring fixture illustrated in FIG. 3.
Figure 5:
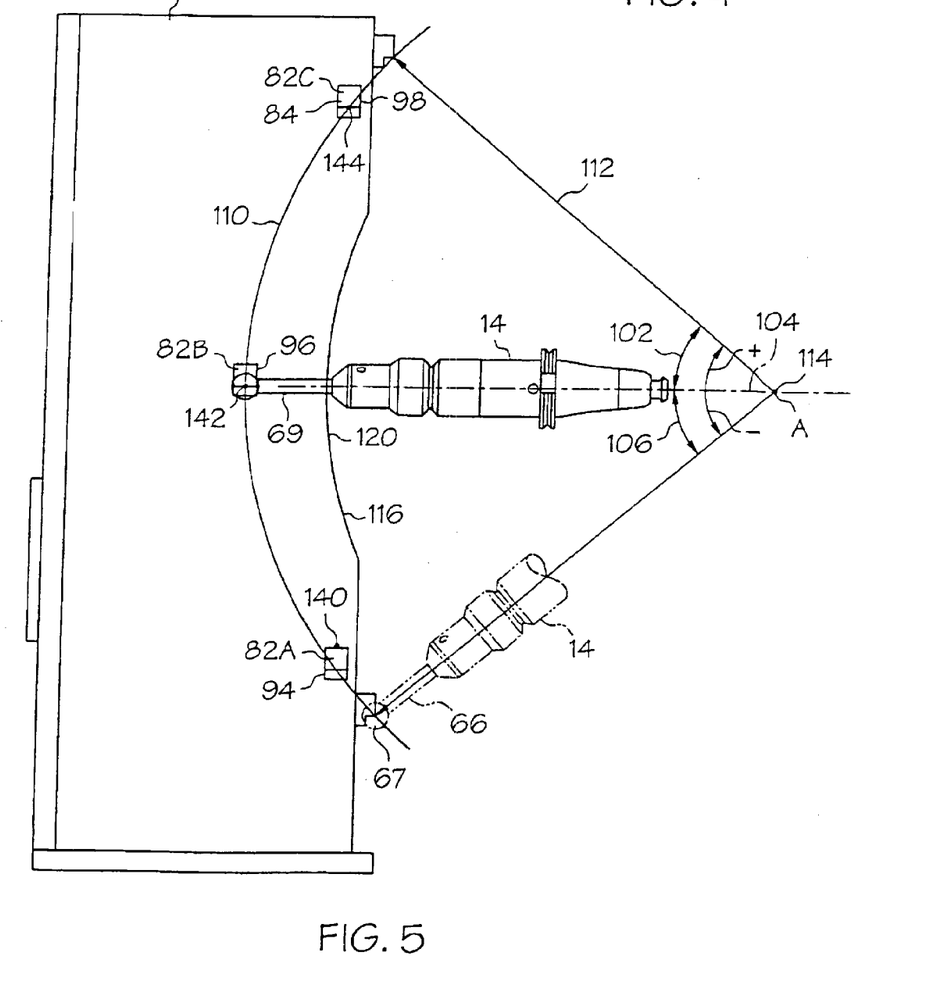
FIG. 5 is a "left hand" side view illustration of the condition monitoring fixture being probed by a spindle mounted probe illustrated in FIG. 3.

Each of the first, second, and third, probe blocks 94, 96, and 98 has first, second, and third block surfaces 82, 84, and 86 as illustrated in FIG. 4. The first, second, and third block surfaces 82, 84, and 86 face in a direction of their respective first, second, and third orthogonal normals 132, 134, and 136, respectively, which are oriented substantially parallel to the 3 linear motion axis X, Y, and Z, respectively, when the fixture is presented to the probe 66 for inspection or probing. In the exemplary embodiment, because the probe blocks have a generally L shaped cross-section, the first and second block surfaces 82 and 84 are chosen on top of the first and second probe blocks 94 and 96, respectively. The third probe block surface 86 is chosen to be on the bottom of the third block 98 because the angle of the probe 66 is such that there is an interference of the probe stylus 69 with the third block if it is probed on the top.

In the exemplary embodiment, there are three first block surfaces 82, designated first, second, and third flat surfaces 82A, 82B, and 82C, and they are preferably co-planar lying in a plane YZ. First and second recesses 116 and 118 in the parallel first and second walls 76 and 78, respectively, provide for clearance and access for the spindle mechanism 10 to probe the blocks. The recesses 116 and 118 preferably have arcuate edges 120 circumscribed about the axis of rotation 114. The first, second, third walls 76, 78, and 80, respectively, are attached to a base 122 which is mountable to the pallet 46.

The trunnion axis A condition monitoring method of the present invention test includes probing the first, second, and third probe blocks 94, 96, and 98, respectively, by touching the first and second block surfaces 82 and 84 on each of the blocks with the probe tip 67 of the probe 66. First, second, and third, probe blocks 94, 96, and 98, respectively, are mounted on one of the outside surfaces of the first wall 76 at first, second, and third angular positions 102, 104, and 106, respectively, along an arc 110 circumscribed by a radius 112 about an axis of rotation 114.

Figure 6:
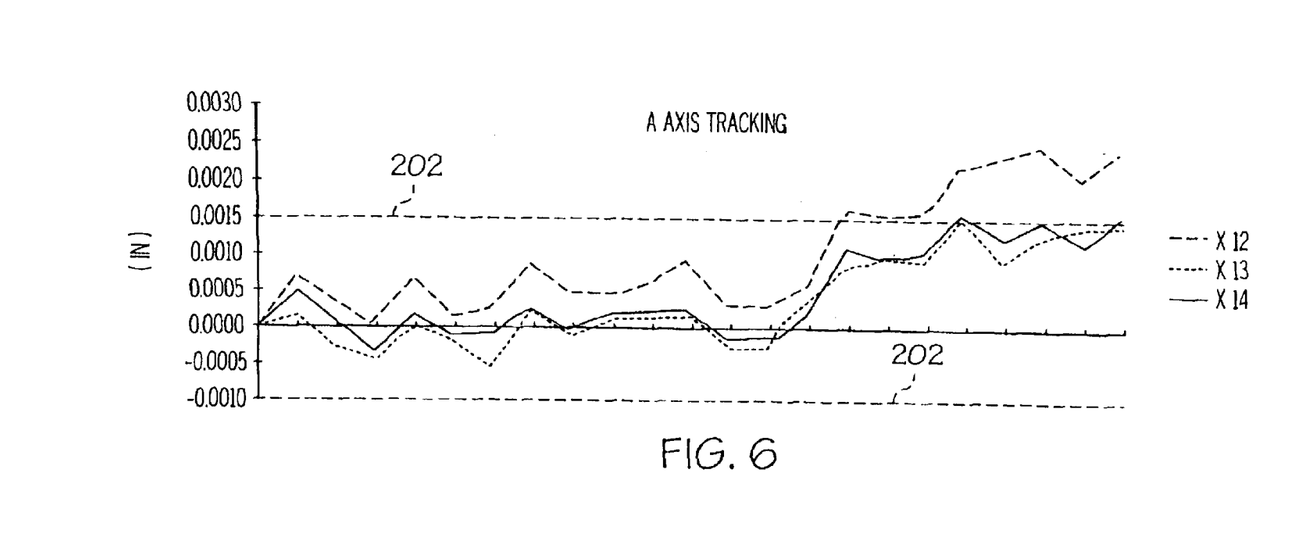
FIG. 6 is a diagrammatic illustration of plots of deviations from the baseline readings used for evaluating A Axis (the trunnion axis A in FIG. 2) tracking in the present invention.

The exemplary embodiment of the present invention uses analysis software running on a personal computer 200 having a computer screen 220 (illustrated in FIG. 2) such as described such as on the artiFACT™ system described above. The fixture SO is mounted on the dedicated machine pallet and the probe blocks on the fixture are probed with the spindle-mounted trigger type probe. First baseline data is established and then operational data is measured, recorded, and compared to the baseline data in the machine control. The software displays a trend of the operational data as illustrated in FIG. 6 compared to specified tolerances 202 to indicate the condition of the trunnion axis A as to whether its condition is acceptable and if not generates an alert message on the machine control screen. An alert indicates that machine alignments need to be corrected. The personal computer analysis software may also display analyses indicating which areas need correcting.

Figure 7:
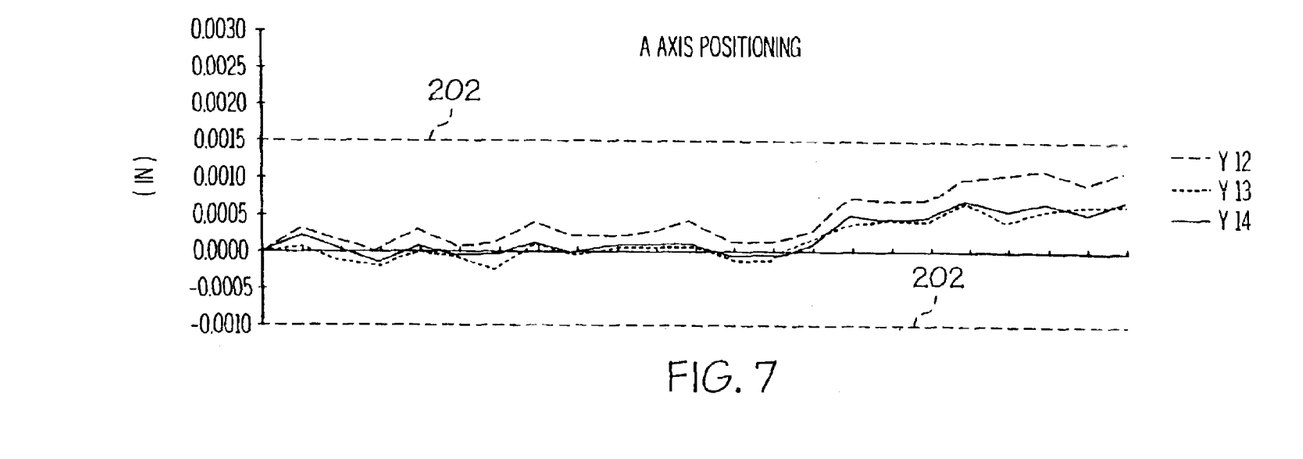
FIG. 7 is a diagrammatic illustration of plots of deviations from the baseline readings used for evaluating A Axis (the trunnion axis A in FIG. 2) positioning in the present invention.
Figure 8:
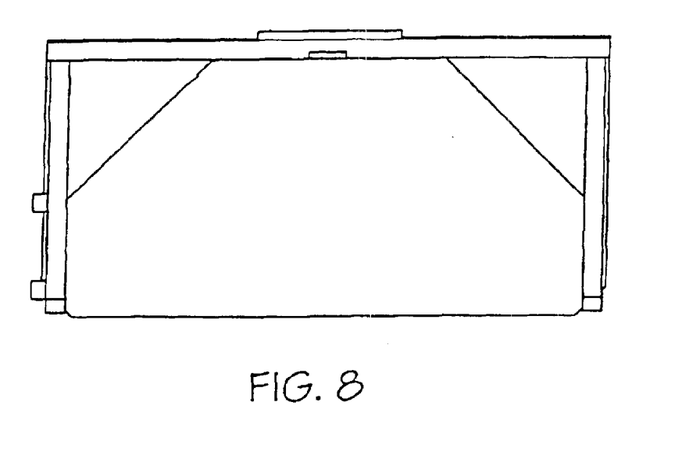
FIG. 8 is a top view illustration of the condition monitoring fixture illustrated in FIG. 3.
Figure 9:
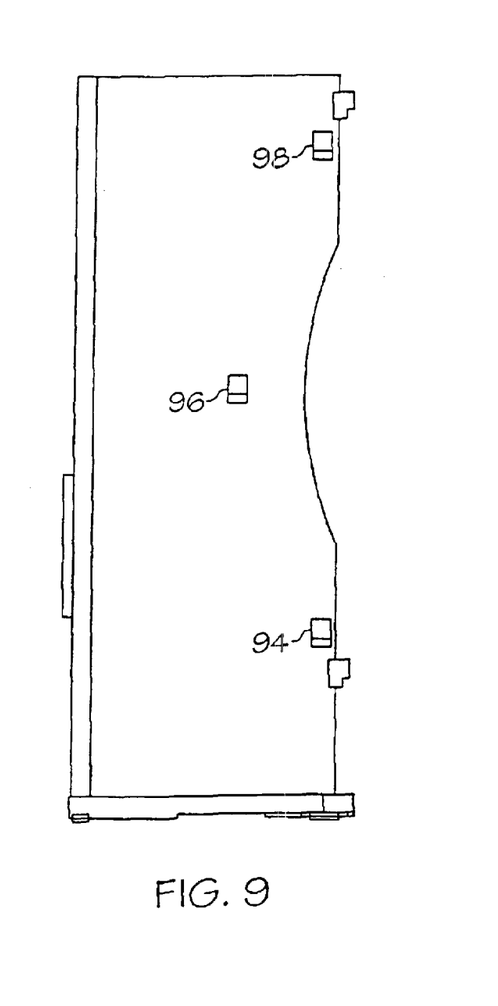
FIG. 9 is a side view illustration of the condition monitoring fixture illustrated in FIG. 3.
Figure 10:
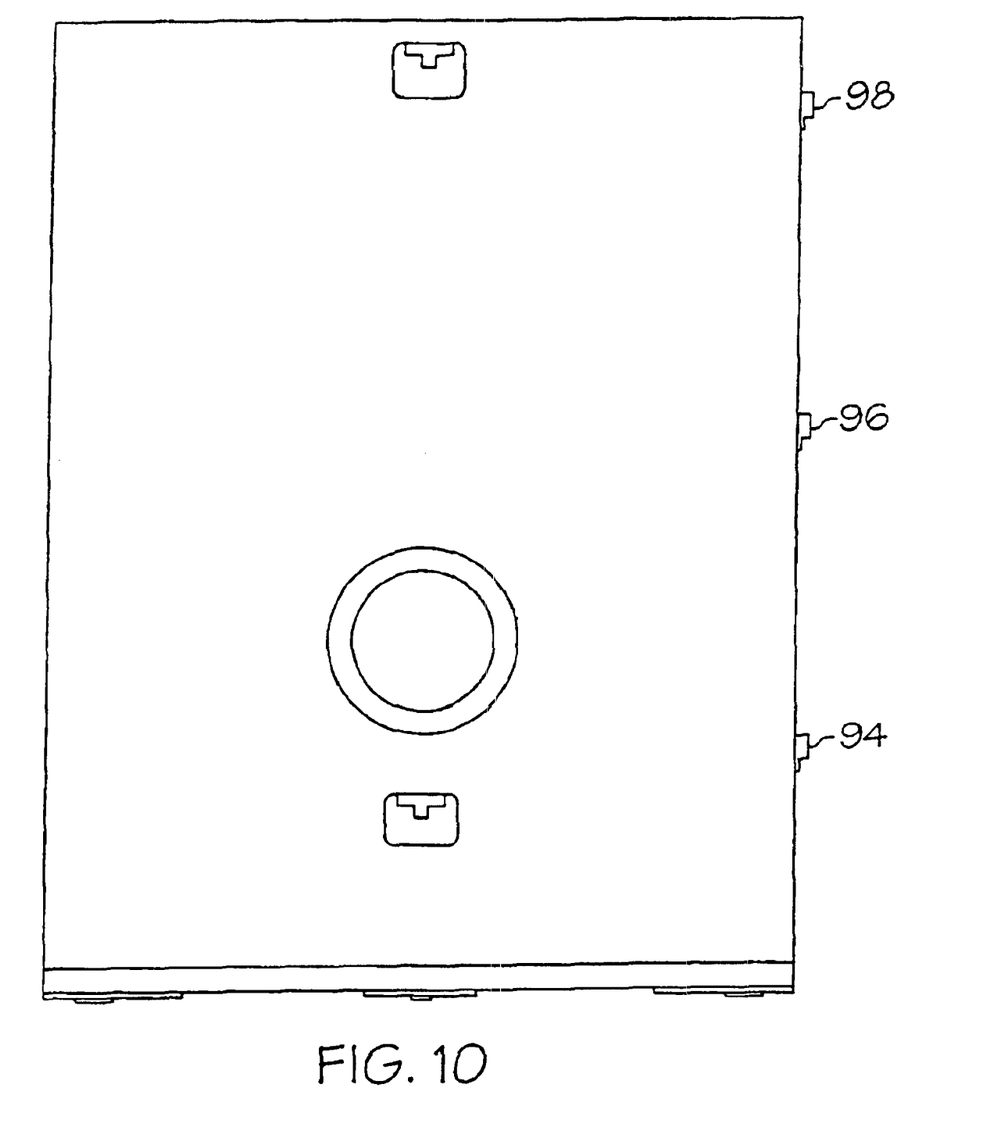
FIG. 10 is a back view illustration of the condition monitoring fixture illustrated in FIG. 3.
Figure 11:
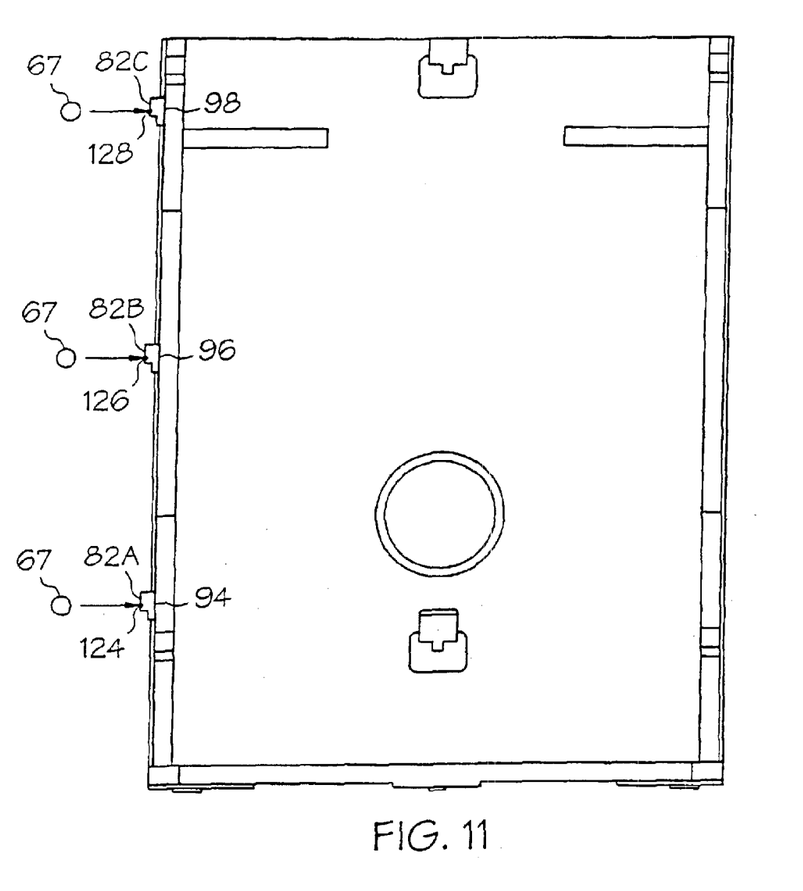
FIG. 11 is a front view illustration of the condition monitoring fixture illustrated in FIG. 3.
Figure 12:
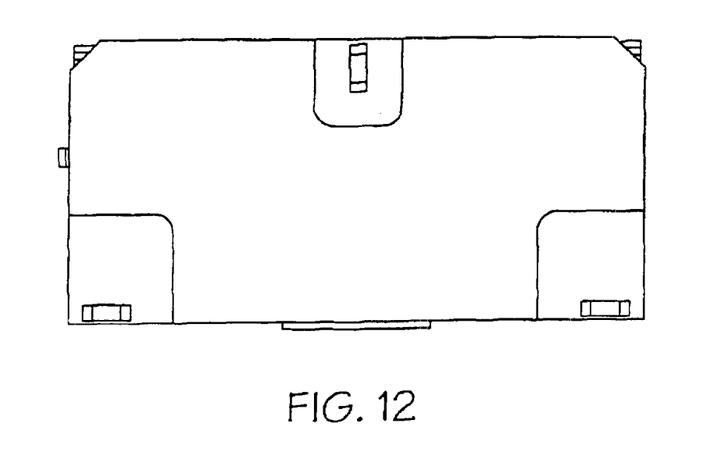
FIG. 12 is a bottom view illustration of the condition monitoring fixture illustrated in FIG. 3.

An exemplary procedure for this method is outlined below and the results are illustrated in FIGS. 6 and 7. The fixture 50 is positioned and presented to the spindle mechanism 10 and probe 66 such that the trunnion axis A and the axis of rotation 114 are aligned of the fixture 50. The first procedure monitors trunnion A-axis tracking. This generally indicates how closely the spindle mechanism 10 is rotating or tracking in the YZ plane of the machine. The fixture is then probed as follows:

1. The spindle mounted probe 66 is positioned on "left" side of the fixture 50 as illustrated in FIG. 10. The probe 66 is rotated about the trunnion axis A in a negative direction –A. The probe is then moved in the X direction to hit (the probe tip touches) a first X touch point 124 on the first flat surface 82A on the first probe block 94. This first value of an X-axis hit location X12 is recorded.
2. The probe 66 is then rotated about the trunnion axis A to 0 degrees. The probe is moved in the X direction to hit a second X touch point 126 on the second flat surface 82B on the second probe block 96. This second value of an X-axis hit location X13 is recorded.
3. The probe 66 is rotated about the trunnion axis A in a positive direction +A. The probe is moved in the X direction to hit a third X touch point 128 on the third flat surface 82C on the third probe block 98. This third value of an X-axis hit location X14 is recorded.
4. The procedure steps 1–3 above are performed first for a baseline reading or readings and then during the machine's operation. Readings during the machine's operation are displayed on the a computer screen 220 of the computer 200 in FIG. 2 as deviations from the baseline readings for trend analysis as illustrated in FIG. 6. Excessive deviations from the plane formed by the three points is reported as an A-axis Tracking Error.

Figure 13:
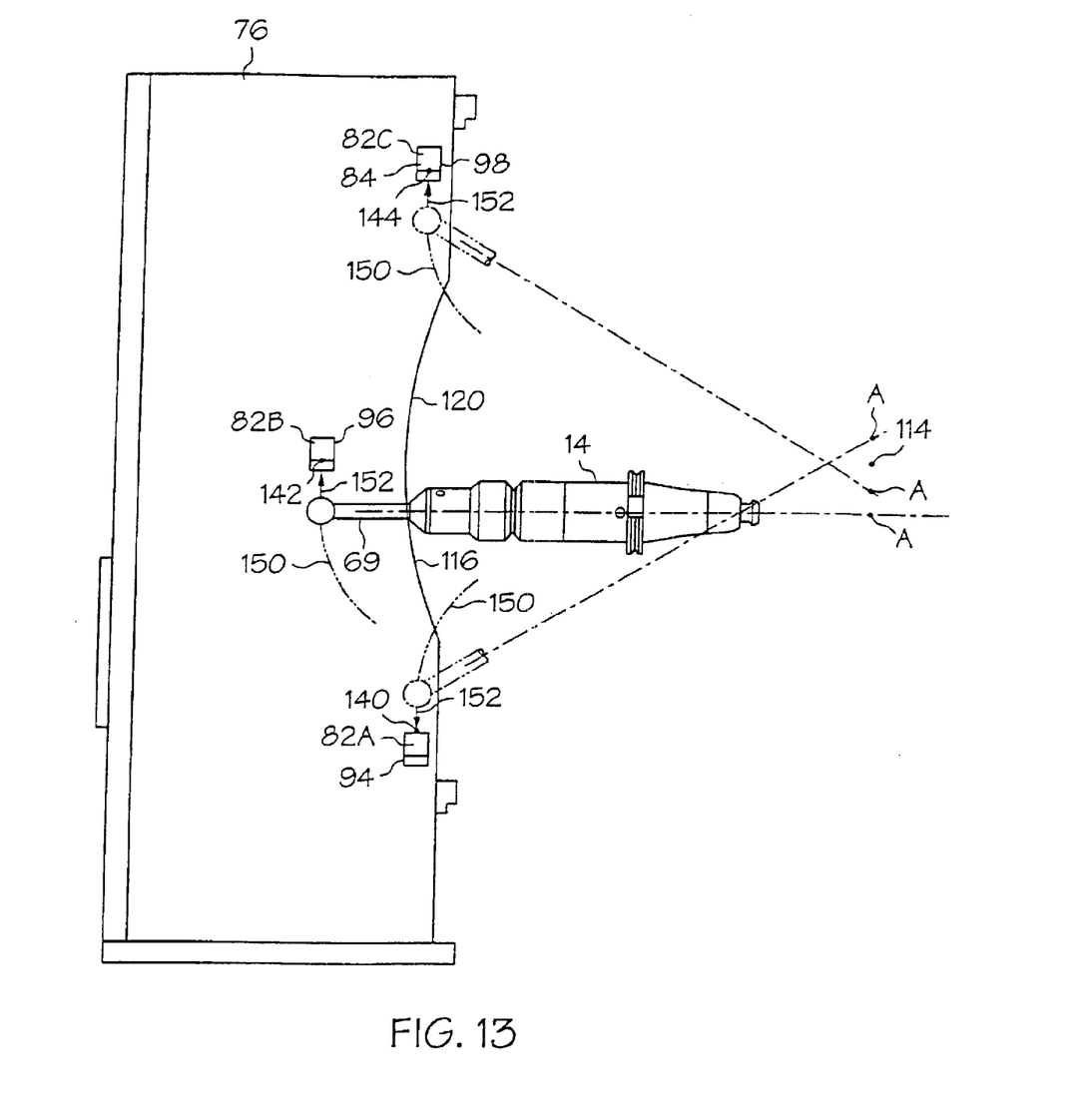
FIG. 13 is a "left hand" side view illustration of a trunnion axis position monitoring method of the present invention.

The second procedure monitors trunnion A-axis positioning. This generally indicates how accurately the spindle mechanism 10 is positioning itself about the trunnion axis. The fixture is probed as follows:

1. The spindle mounted probe 66 is positioned on "left" side of the fixture 50. The trunnion axis A is offset in the Z and Y direction from the axis of rotation 114. The probe 66 is rotated about the trunnion axis A, along a arched path 150 as illustrated in FIG. 13, and is moved in the X direction above the first probe block 94. Then the probe 66 is translated along a straight path 152 in the –Y direction to hit a first Y touch point 140 on the second surface 84 on the first probe block 94. A first value of a Y-axis hit location Y12 is recorded.
2. The trunnion axis A is offset in the Z and Y direction from the axis of rotation 114. The probe 66 is rotated about the trunnion axis A, along a arched path 150 as illustrated in FIG. 13, and is moved in the X direction above the second surface 84 on the second probe block 96. Then the probe 66 is then translated along a straight path 152 in the –Y direction to hit a second Y touch point 142 on the second surface 84 on the second probe block 96. This second value of a Y-axis hit location Y13 is recorded.
3. The probe 66 is rotated about the A-axis and is moved in the X direction above the second surface 84 of the third probe block 98. Then the probe 66 is then translated along a'straight path 152 in the –Y direction to hit a third Y touch point 144 on the second surface 84 on the third probe block 98. This third value of a Y-axis hit location Y14 is recorded.
4. The procedure steps 1–3 above are performed first for a baseline reading or readings and then during the machine's operation. Readings during the machine's operation are displayed on the a computer screen 220 of the computer 200 in FIG. 2 as deviations from the baseline readings for trend analysis as illustrated in FIG. 7.

Excessive deviations from the plane formed by the three points is reported as an A-axis Positioning Error.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A machine tool monitoring fixture for monitoring the accuracy of the location of a machine tool spindle that is movable on an arc about a spindle trunnion axis, the fixture comprising,
   a body,
   first, second, and third blocks mounted on said body at first, second, and third angular positions respectively along an arc circumscribed by a radius about the spindle trunnion axis, and
   said first, second, and third blocks having first, second, and third flat surfaces respectively,
   said first, second, and third flat surfaces having first, second, and third normals that are parallel to said spindle trunnion axis.

2. A fixture as claimed in claim 1 wherein said first, second, and third flat surfaces are coplaner.

3. A fixture as claimed in claim 2 wherein said body comprises parallel first and second walls, and a third wall disposed between, normal to, and connected to said first and second walls, and wherein said first, second, and third blocks are mounted on one of said first and second parallel walls.

4. A monitoring system for monitoring alignment of a spindle trunnion axis of a computer numerically controlled (CNC) machine, said system comprising:
   a probe to measure locations of features on a machine tool monitoring fixture, said probe mounted in a tool holder mounted on a spindle of the machine;
   control means for moving said spindle mounted probe;
   a machine tool monitoring fixture comprising:
   a body,
   first, second, and third blocks mounted on said body at first, second, and third angular positions respectively along an arc circumscribed by a radius about an axis of rotation, and
   said first, second, and third blocks having coplaner first, second, and third flat surfaces with a normal parallel lo said axis of rotation; and
   measuring, recording, and display means for measuring, recording, and displaying location data probed by said probe against said flat surfaces, said means effective to display the location data as a deviation from a baseline measurement.

5. A system as claimed in claim 4 further comprising means for providing instructions for an operator to follow to correct misalignment of the spindle trunnion axis based on the location data.

6. A system as claimed in claim 4 wherein said body comprises parallel first and second walls, and a third wall disposed between, normal to, and connected to said first and second walls.

7. A system as claimed in claim 6 further comprising first and second recesses in said first and second walls respectively.

8. A system as claimed in claim 7 wherein said first, second, and third blocks are mounted on an outer surface of one of said first and second parallel walls, said outer surface facing away from an other of said first and second parallel walls.

9. A system as claimed in claim 8 further comprising a base to which said first, second, and third walls are attached.

10. A system as claimed in claim 9 further comprising a CNC pallet to which said base is mounted.

11. A system as claimed in claim 7 wherein said recesses have arcuate edges circumscribed about said axis of rotation.

12. A machine tool monitoring fixture comprising:
    a body;
    first, second, and third blocks mounted on said body at first, second, and third angular positions respectively along an arc circumscribed by a radius about an axis of rotation;
    said first, second, and third blocks having coplanar first, second, and third flat surfaces respectively;
    said first, second, and third flat surfaces having first, second, and third normals parallel to said axis of rotation;
    said body comprising parallel first and second walls, and a third wall disposed between, normal to, and connected to said first and second walls wherein said first, second, and third blocks are mounted on one of said first and second parallel walls; and,
    first and second recesses in said first and second walls respectively.

13. A fixture as claimed in claim 12 wherein said first, second, and third blocks are mounted on an outer surface of one or said first and second parallel walls, said outer surface facing away from an other of said first and second parallel walls.

14. A fixture as claimed in claim 13 further comprising a base to which said first, second, and third walls are attached.

15. A fixture as claimed in claim 14 wherein said recesses have arcuate edges circumscribed about said axis of rotation.

16. A fixture as claimed in claim 15 further comprising a CNC pallet to which said base is mounted.

* * * * *

UNITED STATES PATENT AND TRADEMARK OFFICE
CERTIFICATE OF CORRECTION

PATENT NO. : 6,810,600 B1
DATED : November 2, 2004
INVENTOR(S) : Horwarth et al.

It is certified that error appears in the above-identified patent and that said Letters Patent is hereby corrected as shown below:

<u>Title page,</u>
Item [57], ABSTRACT,
Line 3, after "of a" delete "the".

<u>Column 1,</u>
Line 59, after "where" delete "a" and insert therein -- an --.

<u>Column 2,</u>
Line 2, after "of" delete "controliwith" and insert therein -- control with --.
Line 11, after "machine" delete "toolls" and insert therein -- tools --.
Line 12, after "system" delete "include's" and insert therein -- includes --.

<u>Column 3,</u>
Line 9, after "mounted" delete "of" and insert therein -- on --.
Line 12, after "for" delete "and".
Line 17, after "for" delete "a".

<u>Column 4,</u>
Line 19, after "motion" delete "axis" and insert therein -- axes --.
Line 19, after "along" delete "3" and insert therein -- three --.
Line 51, after "can also" insert therein -- be --.

<u>Column 5,</u>
Line 12, after "motion" delete "axis" and insert therein -- axes --.
Line 12, after "the" delete "3" and insert therein -- three --.
Line 47, after "described" delete "such as".
Line 48, after "fixture" delete "SO" and insert therein -- 50 --.

<u>Column 6,</u>
Line 24, after, "displayed on the" delete "a".
Lines 37 and 46, after "along" delete "a" and insert therein -- an --.
Line 48, before "the second" delete "above" and insert therein -- below --.
Lines 50 and 57, after "in the" delete "-" and insert therein -- + --.
Line 55, after "direction" delete "above" and insert therein -- below --.
Line 57, after "along a" delete """ and insert therein --  --.
Line 64 after "on the" delete "a".

UNITED STATES PATENT AND TRADEMARK OFFICE
CERTIFICATE OF CORRECTION

PATENT NO. : 6,810,600 B1
DATED : November 2, 2004
INVENTOR(S) : Horwarth et al.

It is certified that error appears in the above-identified patent and that said Letters Patent is hereby corrected as shown below:

Column 7,
Line 50, after "parallel" delete "lo" and insert therein -- to --.

Signed and Sealed this

Nineteenth Day of July, 2005

JON W. DUDAS
*Director of the United States Patent and Trademark Office*